Patented Jan. 3, 1933

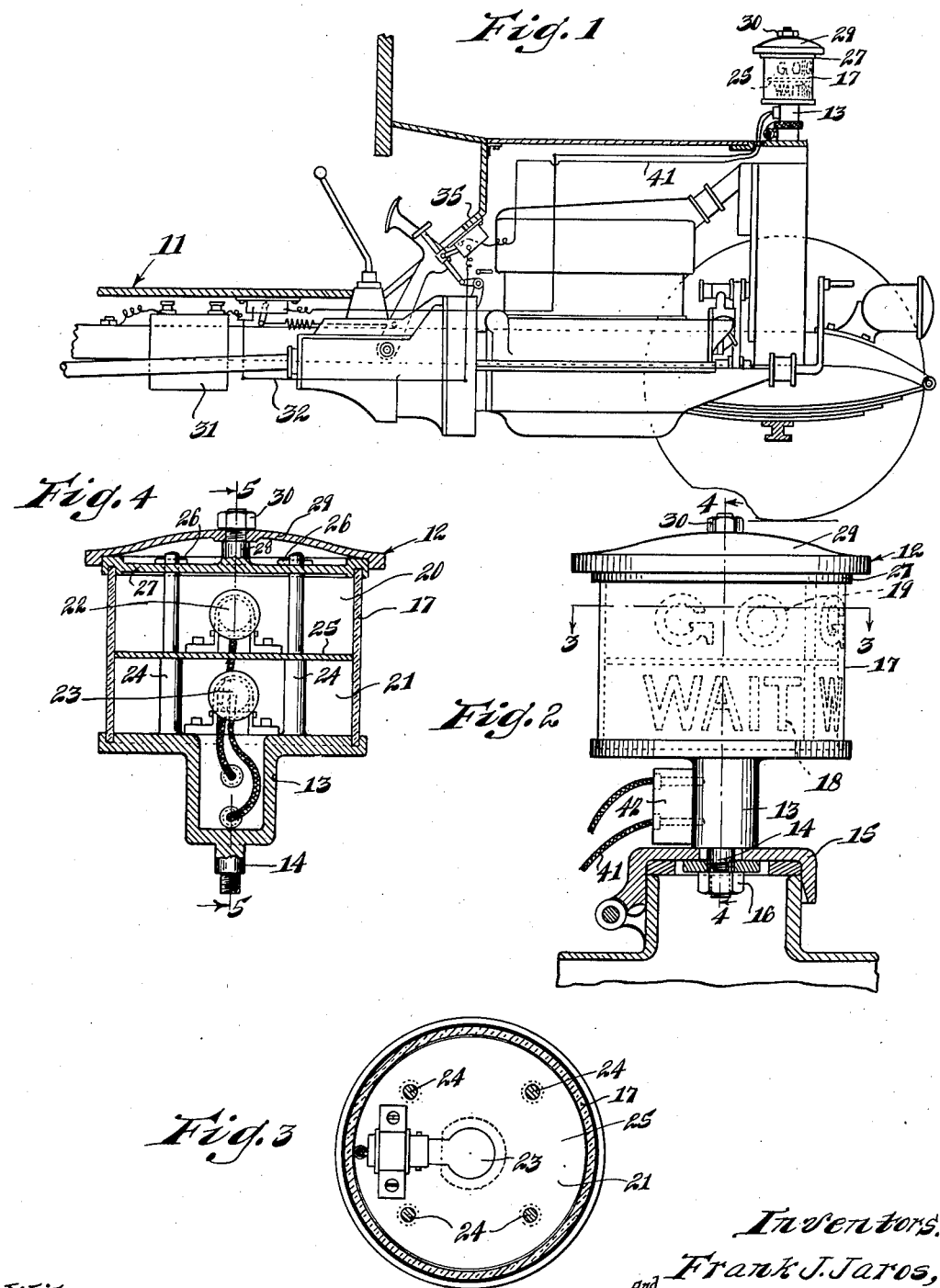

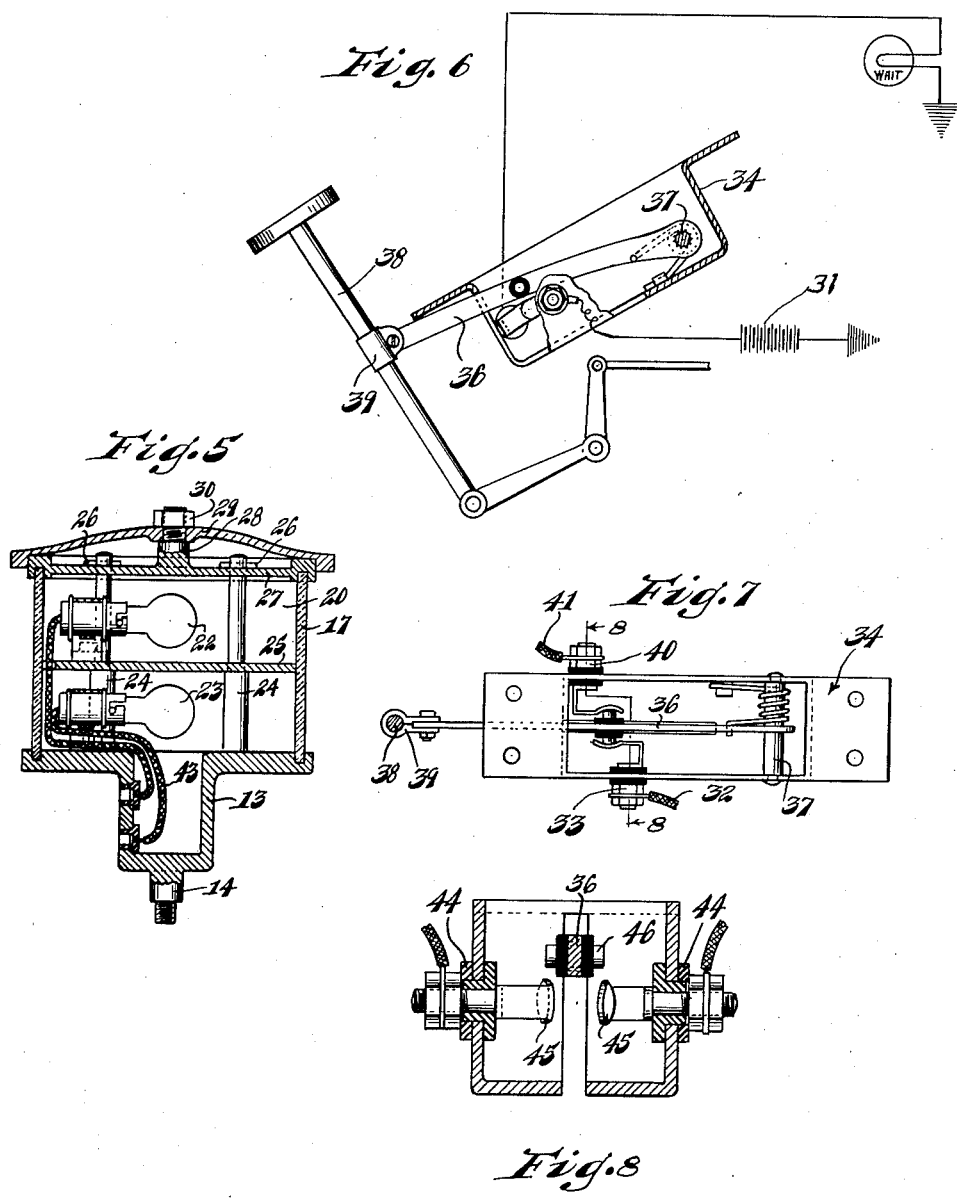

1,893,369

UNITED STATES PATENT OFFICE

FRANK JAMES JAROS AND EDWARD THOMAS JAROS, OF CHICAGO, ILLINOIS

SIGNALING DEVICE FOR AUTOMOBILES

Original application filed December 30, 1927, Serial No. 243,499. Divided and this application filed June 19, 1929. Serial No. 372,195.

This invention relates to improvements in signaling devices for automobiles and has for its object the provision of a visual signal located at the forward end of an automobile for the purpose of warning and indicating to pedestrians and the drivers of other vehicles an intention on the part of the driver to proceed or accelerate the speed of the driven automobile. More particularly, an object of the invention is to cause illumination of a visual signal located at the front of the vehicle and bearing indicia that the automobile is to proceed, which signal is rendered automatically operative by means of the automobile driving mechanism.

Other objects will appear hereinafter.

The present application constitutes a divisional application of applicants' copending application, Serial No. 243,499, filed December 30, 1927, for improvements in signaling devices for automobiles.

The invention consists in the combinations and arrangements of parts hereinafter described and claimed.

The invention will be best understood by reference to the accompanying drawings forming a part of this specification and in which:

Fig. 1 is a side elevation of an automobile chassis with a portion of the hood and radiator shell in section, illustrating the application of the device to an automobile;

Fig. 2 is an enlarged side elevational view of the casing containing the signal light, illustrating the preferred method of mounting upon an automobile radiator cap;

Fig. 3 is a horizontal section taken on the line 3—3 of Fig. 2;

Fig. 4 is a vertical section taken substantially on the line 4—4 of Fig. 2;

Fig. 5 is a vertical section of the signal casing taken substantially on the line 5—5 of Fig. 4;

Fig. 6 is a view showing the accelerator switch in section and a method of connection to the accelerator rod, as well as a wiring diagram;

Fig. 7 is a plan view of the accelerator switch detached; and

Fig. 8 is a cross section thereof taken substantially on the line 8—8 of Fig. 7.

The preferred embodiment of the invention illustrated in the drawings is shown in operative association with an automobile 11, and, although the present application is directed to the "wait" or equivalent signaling means operatively connected to the mechanism for accelerating the speed of the automobile, portions of an alternative signaling device to convey a "go" or an equivalent signal, as covered in applicants' parent application, are shown. The signal casing 12 is provided with a base member 13 having a depending stem 14 for convenient mounting by insertion through an opening in a radiator cap 15 in which position it may be rigidly secured by a nut 16. In this manner the signal casing is grounded to the car chassis.

The upper surface of the base 13 is provided with an annular groove within which is fitted a translucent or transparent light emitting member 17, preferably of glass or equivalent material, the lower portion of which carries a "wait" signal 18 or an equivalent signal, and the upper portion may bear a "go" signal 19 or equivalent. A preferred method of rendering these signals conspicuous is to inscribe the lettering of the lower "wait" signal in red upon an opaque or black background and to inscribe the "go" signal in green upon a similar background although obviously other expedients may be adopted to convey the alternative signals.

In carrying out this purpose, the member 17 is divided into an upper compartment 20 and a lower compartment 21, within which are mounted electric lamps 22 and 23, respectively, as shown. Extending upwardly from the base member 13 are a plurality of posts 24 which are reduced in diameter intermediate their length for the support of a disk 25 which serves to divide the casing into two compartments and prevent the illumination of the signal of one compartment by the lamp in the other compartment. As shown in the various figures, the signals are visible from each side of the vehicle and from the front of the vehicle, and inasmuch as the signaling device is located upon the radiator cap, it is rendered particularly conspicuous, and the signals attract the eye of pedestrians and other drivers. The upper ends of posts 24 are provided with transverse holes or openings for the reception of cotter pins 26 which hold in place a cover member 27 through which the posts 24 project. Cover 27 is provided centrally thereof with an upwardly extending threaded stud 28 which is adapted to extend through an opening in a cap 29 held in place by nut 30.

One terminal of the storage battery 31 is grounded to the frame or chassis of the automobile in the usual manner and the other terminal is connected by wire 32 to post 33 of switch 34. Switch 34 is adapted to be operated by means of the mechanism which causes the automobile to accelerate in speed and thus a convenient mounting is beneath the floor board 35, as shown in Fig. 1, and in this mounting and arrangement, switch lever 36 is pivoted at one end within the switch at 37, and the opposite end may be secured to accelerator rod 38 by strap 39. The second post 40 of switch 34 is connected by wire 41 to lamp 23 located in the lower compartment of the signal casing and for convenient connection and disconnection, a plug 42 is preferably provided by means of which wire 41 may be electrically connected to wire 43 within the casing in the usual manner. Posts 33 and 40 are insulated from the switch proper by plugs 44 of non-conducting material and mounted inwardly upon said posts are spring contact members 45 which are spaced both from the top and bottom of the switch 34 and also spaced apart a distance slightly less than the length of transverse bar 46 which extends through but is insulated from the switch lever 36. The preferred operation is to cause the illumination of the "wait" signal immediately following the initial depression of the accelerator rod 38 and for a limited duration of the continued depression thereof so that the signal will not remain illuminated while the accelerator rod is depressed to the usual extent in the ordinary travel of the vehicle. Thus, as shown in Fig. 6, bar 46 will normally be above and out of engagement with contacts 45, and the signal will not be illuminated. This will be the condition when the vehicle is standing still, for example, before proceeding across a street intersection. When the accelerator rod 38 is depressed, the circuit will be closed through contacts 45 by means of bar 46 during the initial depression, as stated, causing illumination of the "wait" signal and thus an indication to others that the vehicle is proceeding ahead. However, as the depression continues until the required speed is attained, the circuit will be broken by cross bar 46 passing below the contacts 45.

While we have described and illustrated the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having described our invention, what we claim as new and desire to secure by Letters Patent is:

In combination with a motor vehicle, a signaling device mounted upon the forward portion of the vehicle and arranged to be visible from the front and each side of the vehicle, an electric lamp mounted within said device, a switch provided with two contacts, one being connected to said lamp and the other to the vehicle battery, a switch lever having one end pivotally mounted adjacent said switch and adapted to electrically connect said contacts only during the intermediate portion of the depression of said lever, and an operative connection between the opposite end of said switch lever and the accelerating mechanism of the vehicle whereby said switch lever will be depressed upon operation of said accelerating mechanism.

In testimony whereof we have signed our names to this specification.

FRANK JAMES JAROS.
EDWARD THOMAS JAROS.